United States Patent
Calman et al.

(10) Patent No.: US 9,384,478 B2
(45) Date of Patent: Jul. 5, 2016

(54) OFFLINE MOBILE BANKING SYSTEM (71) Applicant: BANK OF AMERICA CORPORATION, Charlotte, NC (US)

(72) Inventors: Matthew A. Calman, Charlotte, NC (US); Dipika Jain, Charlotte, NC (US); William Kelley, Charlotte, NC (US); Chris Purvis, Waxhaw, NC (US); Michael E. Toth, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 88 days.

(21) Appl. No.: 13/946,519

(22) Filed: Jul. 19, 2013

(65) Prior Publication Data

US 2015/0026055 A1 Jan. 22, 2015

(51) Int. Cl.
*G06Q 40/06* (2012.01)
*G06Q 20/36* (2012.01)
*G06Q 20/32* (2012.01)
*G06Q 40/02* (2012.01)

(52) U.S. Cl.
CPC ............ *G06Q 20/3223* (2013.01); *G06Q 40/02* (2013.01)

(58) Field of Classification Search
CPC ... G06F 17/30575; G06Q 30/02; G06Q 30/06
USPC .............. 705/39, 26.3, 26.8, 41, 42
See application file for complete search history.

(56) References Cited

U.S. PATENT DOCUMENTS

| | | | |
|---|---|---|---|
| 8,014,755 B2 | 9/2011 | Sun et al. | |
| 8,019,365 B2 | 9/2011 | Fisher | |
| 8,190,087 B2 * | 5/2012 | Fisher et al. | 455/41.2 |
| 8,260,707 B2 | 9/2012 | Treadwell et al. | |
| 8,352,323 B2 | 1/2013 | Fisher | |
| 8,423,466 B2 | 4/2013 | Lanc | |
| 8,429,071 B2 | 4/2013 | Davis et al. | |
| 2002/0107756 A1 * | 8/2002 | Hammons et al. | 705/26 |
| 2008/0065648 A1 * | 3/2008 | Gupta et al. | 707/10 |
| 2011/0065420 A1 * | 3/2011 | Reyes | 455/411 |
| 2011/0302083 A1 * | 12/2011 | Bhinder | 705/44 |
| 2013/0060692 A1 * | 3/2013 | Typrin et al. | 705/44 |
| 2013/0246260 A1 * | 9/2013 | Barten et al. | 705/41 |
| 2014/0236792 A1 * | 8/2014 | Pant et al. | 705/35 |
| 2016/0042344 A1 * | 2/2016 | Thimmana | G06Q 20/3672 705/41 |

OTHER PUBLICATIONS

U.S. Appl. No. 13/553,423, filed Jul. 19, 2012, Calman et al.
U.S. Appl. No. 13/553,463, filed Jul. 19, 2012, Calman et al.
U.S. Appl. No. 13/553,511, filed Jul. 19, 2012, Calman et al.

* cited by examiner

*Primary Examiner* — Jagdish Patel
(74) *Attorney, Agent, or Firm* — Michael A. Springs; Moore & Van Allen PLLC; W. Kevin Ransom (57) ABSTRACT

Embodiments of the invention are directed to systems, methods and computer program products for providing an offline mobile banking system. An exemplary apparatus is configured to: provide, at a mobile device, a transaction request, determine a connection is not established between the mobile device and a device associated with the financial institution, store the transaction request in response to determining a connection has not been established, establish a connection between the mobile device and a server associated with the financial institution, and communicate the stored transaction request from the mobile device to a device associated with the financial institution.

26 Claims, 7 Drawing Sheets

DETERMINING A CONNECTION IS NOT ESTABLISHED BETWEEN THE MOBILE DEVICE AND A DEVICE ASSOCIATED WITH THE FINANCIAL INSTITUTION
300

DETERMINING THE MOBILE DEVICE HAS A NETWORK CONNECTION
310

ASSESSING ONE OR MORE USER PREFENCES FOR ESTABLISHING A CONNECTION BETWEEN THE MOBILE DEVICE AND A DEVICE ASSOCIATED WITH THE FINANCIAL INSTUTION
320

DETERMINING A CONNECTION CANNOT BE ESTABLISHED BETWEEN THE MOBILE DEVICE AND A DEVICE ASSOCIATED WITH THE FINANCIAL INSTITUTION
330

*FIGURE 3*

STORING THE TRANSACTION REQUEST IN RESPONSE TO DETERMINING A CONNECTION HAS NOT BEEN ESTABLISHED
400

LOCALLY STORING A TRANSACTION REQUEST
410

REMOTELY STORING A TRANSACTION REQUEST
420

QUEUING ONE OR MORE TRANSACTION REQUEST
430

NOTIFYING A USER OF ONE OR MORE STORED TRANSACTION REQUEST
440

*FIGURE 4*

ESTABLISHING A CONNECTION BETWEEN THE MOBILE DEVICE AND A SERVER ASSOCIATED WITH THE FINANCIAL INSTITUTION
500

QUERYING THE FINANCIAL INSTITUTION TO DETERMINE THAT A CONNECTION CAN BE ESTABLISHED BETWEEN THE MOBILE DEVICE AND A DEVICE ASSOCIATED WITH THE FINANCIAL INSTITUTION
510

ASSESSING ONE OR MORE FACTORS ASSOCIATED WITH THE MOBILE DEVICE TO DETERMINE A CONNECTION CAN BE ESTABLISHED BETWEEN THE MOBILE DEVICE AND A DEVICE ASSOCIATED WITH THE FINANCIAL INSTITUTION
520

*FIGURE 5*

COMMUNICATING THE STORED TRANSACTION REQUEST FROM THE MOBILE DEVICE TO A
DEVICE ASSOCIATED WITH THE FINANCIAL INSTITUTION
600

SUBMITTING TRANSACTION REQUEST BASED ON THE QUEUE
610

NOTIFYING THE USER OF A PROCESSED TRANSACTION REQUEST
620

UPDATING THE USER'S ACCOUNT HISTORY
630

OFFLINE MOBILE BANKING SYSTEM

BACKGROUND

Over time, mobile banking has become a primary means for many consumers to conduct everyday financial transactions with their respective financial institution(s). While mobile banking has many advantages, in some instances, the lack of a steady network connection is an inconvenience in processing transactions. Therefore, there is a need for a system that allows a customer to conduct mobile banking transactions while offline.

BRIEF SUMMARY

Embodiments of the invention are directed to systems, methods, and computer program products for providing an offline mobile banking system. An exemplary apparatus comprises An apparatus for providing offline mobile banking, the apparatus comprising a memory, a processor, and a module stored in the memory, executable by the processor, and configured to provide, at a mobile device, a transaction request, determine a connection is not established between the mobile device and a device associated with the financial institution, store the transaction request in response to determining a connection has not been established, establish a connection between the mobile device and a server associated with the financial institution, and communicate the stored transaction request from the mobile device to a device associated with the financial institution.

In some embodiments, the module is further configured to authenticate the mobile device prior to receiving a transaction request.

In some embodiments, communicating the stored transaction request further comprises the module being configured to verify the mobile device is an authenticated device, and wherein verifying the mobile device is an authenticated device does not require user input.

In some embodiments, the transaction request is stored locally on the mobile device. In other embodiments, the transaction request is store remotely in cloud storage.

In some embodiments, the module is further configured to notify the user that the transaction request cannot be processed in response to response to determining a connection has not been established.

In some embodiments, the module is further configured to temporarily update the account history displayed on the mobile device based at least partially on the stored transaction request.

In some embodiments, storing the transaction request further comprises the module being configured to queue a transaction request based on the order in which it was received.

In some embodiments, storing the transaction request further comprises the module being configured to queue a transaction request based on a priority for the transaction request specified by one or more user preferences.

The apparatus of claim 1, wherein communicate the transaction request further comprises the module being configured to queue a transaction request based on a priority for the transaction request specified by one or more user preferences.

In some embodiments, the module is further configured to notify the user that the stored transaction request has been successfully processed by the financial institution.

In some embodiments, the module is further configured to notify the user that the stored transaction request has been unsuccessfully processed by the financial institution.

An exemplary method may comprise one or more steps for providing an offline mobile banking system. The one or more steps may include but not be limited to providing, at a mobile device, a transaction request, determining a connection is not established between the mobile device and a device associated with the financial institution, storing the transaction request in response to determining a connection has not been established, establishing a connection between the mobile device and a server associated with the financial institution, and communicating the stored transaction request from the mobile device to a device associated with the financial institution.

In some embodiments, the method further comprises authenticating the mobile device prior to receiving a transaction request.

In some embodiments, the method further comprises communicating the stored transaction request further comprises verifying the mobile device is an authenticated device, and wherein verifying the mobile device is an authenticated device does not require user input.

In some embodiments, the method further comprises wherein the transaction request is stored locally on the mobile device. In other embodiments, the method further comprises wherein the transaction request is store remotely in cloud storage.

In some embodiments, the method further comprises notifying the user that the transaction request cannot be processed in response to response to determining a connection has not been established.

In some embodiments, the method further comprises temporarily updating the account history displayed on the mobile device based at least partially on the stored transaction request.

In some embodiments, the method further comprises queuing a transaction request based on the order in which it was received.

In some embodiments, the method further comprises queuing a transaction request based on a priority for the transaction request specified by one or more user preferences.

In some embodiments, the method further comprises communicating the transaction request further comprises communicating a transaction request based on the order in which it was received.

In some embodiments, the method further comprises communicating the transaction request further comprises communicating a transaction request based on a priority for the transaction request specified by one or more user preferences.

In some embodiments, the method further comprises notifying the user that the stored transaction request has been successfully processed by the financial institution.

In some embodiments, the method further comprises notifying the user that the stored transaction request has been unsuccessfully processed by the financial institution.

An exemplary computer program product for providing offline mobile banking, the computer program product comprises a non-transitory computer-readable medium comprising a set of codes for causing a computer to provide, at a mobile device, a transaction request, determine a connection is not established between the mobile device and a device associated with the financial institution, store the transaction request in response to determining a connection has not been established, establish a connection between the mobile device and a server associated with the financial institution, and communicate the stored transaction request from the mobile device to a device associated with the financial institution.

In some embodiments, the computer program product further comprises a set of codes for causing a computer to authenticate the mobile device prior to receiving a transaction request.

In some embodiments, the computer program product further comprises a set of codes for causing a computer to communicate the stored transaction request from the mobile device to a device associated with the financial institution further comprises a set of codes for causing a computer to verify the mobile device is an authenticated device, and wherein verifying the mobile device is an authenticated device does not require user input.

In some embodiments, the computer program product further comprises a set of codes for causing a computer to temporarily update the account history displayed on the mobile device based at least partially on the stored transaction request.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention now may be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure may satisfy applicable legal requirements. Like numbers refer to like elements throughout.

Embodiments of the invention are directed to systems, methods and computer program products for providing a mean for processing offline mobile banking transactions. The invention enables an user to request a financial transaction when their mobile device is not connected with the financial institution and the mobile device automatically completes that transaction when a connection is established.

In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user profile that includes only personal information associated with the user, or the like. The account is associated with and/or maintained by the entity. In other embodiments, an entity may not be a financial institution. In still other embodiments, the entity may be the merchant itself.

In some embodiments, the "user" may be a customer (e.g., an account holder or a person who has an account (e.g., banking account, credit account, or the like) at the entity) or potential customer (e.g., a person who has submitted an application for an account, a person who is the target of marketing materials that are distributed by the entity, a person who applies for a loan that not yet been funded).

Figure 1:
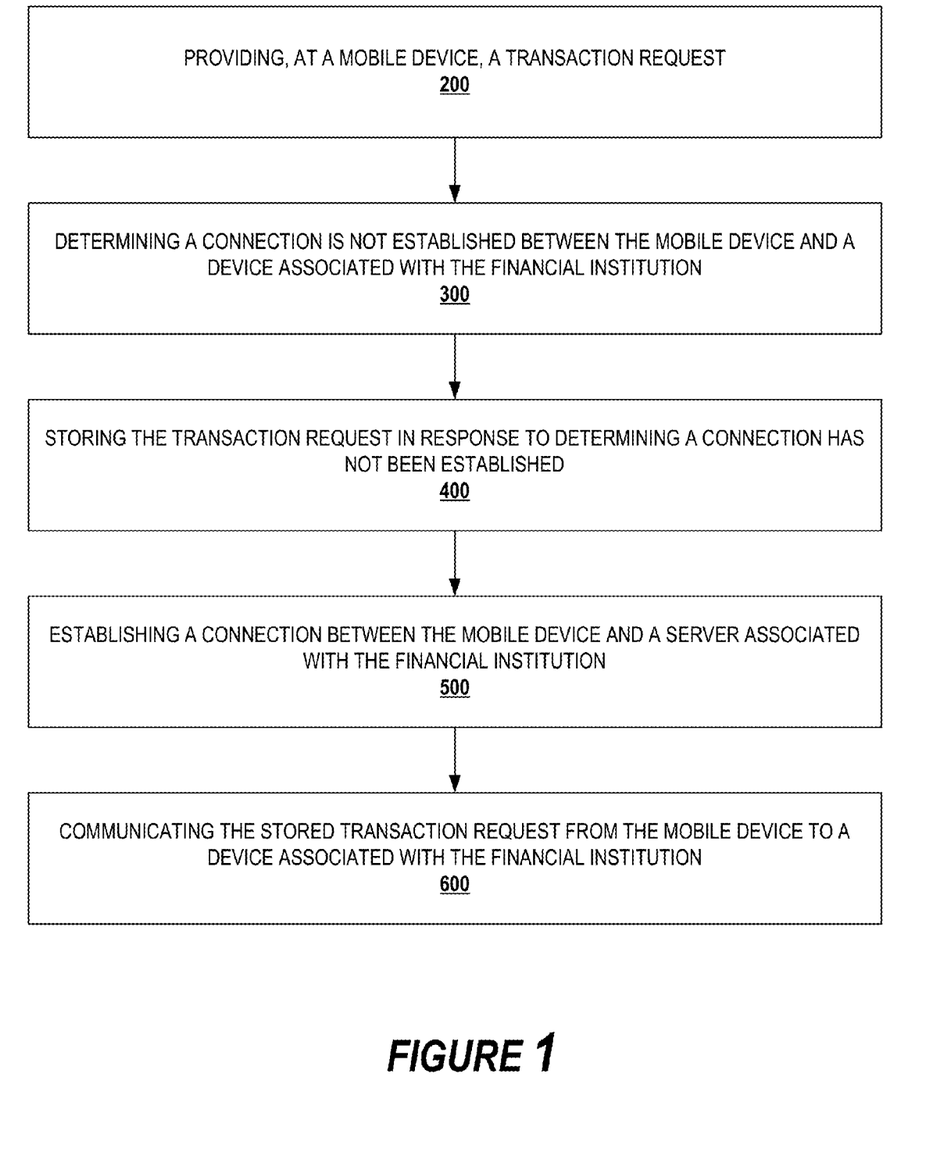
FIG. 1 is a flowchart illustrating a general process flow for providing an offline mobile banking system, in accordance with embodiments of the present invention.

Referring now to FIG. 1, a general process flow 100 is depicted for providing an offline mobile banking system, according to embodiments of the present invention. As illustrated, the method may comprise one or more steps including, but not limited to, receiving a transaction request 200, determining a connection is not established between the mobile device and a device associated with the financial institution 300, storing the transaction request in response to determining a connection has not been established 400, establishing a connection between the mobile device and a server associated with the financial institution 500, and communicating the stored transaction request from the mobile device to the server associated with the financial institution.

In some embodiments, the mobile device is authenticated prior to attempting to conduct a transaction using the offline mobile banking system. Authenticating the mobile device may comprise sending an authentication request to the financial institution to associate (e.g., enroll) the mobile device (e.g., a laptop, personal digital assistant (PDA), cell phone, smart phone, tablet, mp3 player, or any other suitable electronic device) with the customer's online banking account. The association request may be submitted by the mobile device via a mobile application (e.g., a mobile banking application) or via a mobile banking website and received by a system associated with the financial institution. For example, a mobile banking application downloaded onto the mobile device may prompt the customer to enroll the mobile device as device for conducting offline mobile banking transactions. In some embodiment, the mobile banking application is a mobile banking website accessed via the mobile device.

The association request typically includes device identification information associated with the mobile device and account identification information associated with the customer's online banking account.

The device identification information associated with the mobile device may be any information sufficient to generate a device "fingerprint," or unique signature of the customer's mobile device. Device identification information may be collected from a variety of sources. In some embodiments, the device identification information includes an identification code. The identification code may be but is not limited to a serial number or an item number of the device. In some embodiments, the device identification information may be associated with a chip associated with the mobile device. The chip may be but is not limited to a subscriber identification module (SIM) card, removable hard drive, processor, microprocessor, or the like. In other embodiments, the device identification information may be associated with a removable part of the mobile device. Removable parts include but are not limited to detachable keyboards, battery covers, cases, hardware accessories, or the like. Removable parts may contain serial numbers or part numbers. In some embodiments, device identification information may need to be entered manually at the mobile device. For example, the mobile banking system may prompt the customer for manual entry of the device identification information (e.g., a serial number, an identification code, an International Mobile Station Equipment Identity (IMEI), a phone number, a chip, a removable part, or similar pieces of device identification information). In other embodiments, device identification information may not be based on user input received at the mobile device. Instead, the device identification information may be automatically provided by the mobile device. In yet another embodiment, the mobile device may provide the information without requiring user input after receiving a request from the online banking system for the identification information.

The account identification information may be any information sufficient to identify the customer's online banking account. In some embodiments, the account identification information may include, but is not limited to, at least one of a customer name, contact information, a username, a password, a PIN number, a unique identification number associated with the customer, social network information, an account number, or a card number. In some embodiments, the account identification information may be proprietary to the financial institution, such as an account number, a reference number to an account, a client number, or the like. In other embodiments, the account identification information may be public information, such as a phone number, mailing address, email address, or the like. The account identification information may be automatically provided by the mobile device. Alternatively, the customer may manually provide this information. For example, the customer may enter a username and a password associated with the customer's online banking account. The username and password may be provided in conjunction with the association request or may have been previously provided at the beginning of an online banking session, such as a mobile banking session (e.g., in order to log into a mobile banking application or mobile banking website). Accordingly, the account identification information may include information related to an mobile banking session The method may additionally include authenticating the identity of the customer. For example, the mobile banking system may prompt the customer to enter authentication information (e.g., customer identification information) such as a username, a password, a personal identification number (PIN), a passcode, biometric information (e.g., voice authentication, a fingerprint, and/or a retina scan), or an answer to a security question. This authentication information may be used to authenticate the identity of the customer (e.g., determine that the authentication information is associated with the account) and determine that the customer has authority to access the online banking account. In some embodiments, this step of authenticating the identity of the customer may be part of a strong authentication process. A strong authentication process is a security measure that requires two or more authentication steps. In this regard, the customer may have previously provided a username and password when initiating a mobile banking session (e.g., when submitting an online banking session initiation request) or when submitting the association request. Accordingly, the customer may be prompted to enter additional authentication information (e.g., additional identification information), such as a PIN, biometric information, and/or an answer to a security question in order to further verify the identity of the customer (e.g., determine that the additional authentication information is associated with the online banking account).

After completing an initial authentication, the mobile device is associated (e.g., enrolled) with the customer's online banking account. In this regard, the account identification information and customer identification information provided by the customer is typically used to locate records (e.g., customer account information) in the online banking system associated with the customer's online banking account. Once the records associated with the customer's online banking account are located, an association is made between the identity of the mobile device and the customer's online banking account. Once the association is made, at block 140, the online banking system typically creates an association record in memory of the association between the identity of the mobile device and the customer's online banking account.

In one embodiment, this association between the identity of the mobile device and the customer's online banking account indicates that the mobile device has permission to define access restrictions to the customer's online banking account. Furthermore, this association between the mobile device and the customer's online banking account may be used to associate the mobile device with the customer's identity. Accordingly, the identity of the mobile device may be used to identify the customer and to identify the customer's online banking account.

Figure 2:
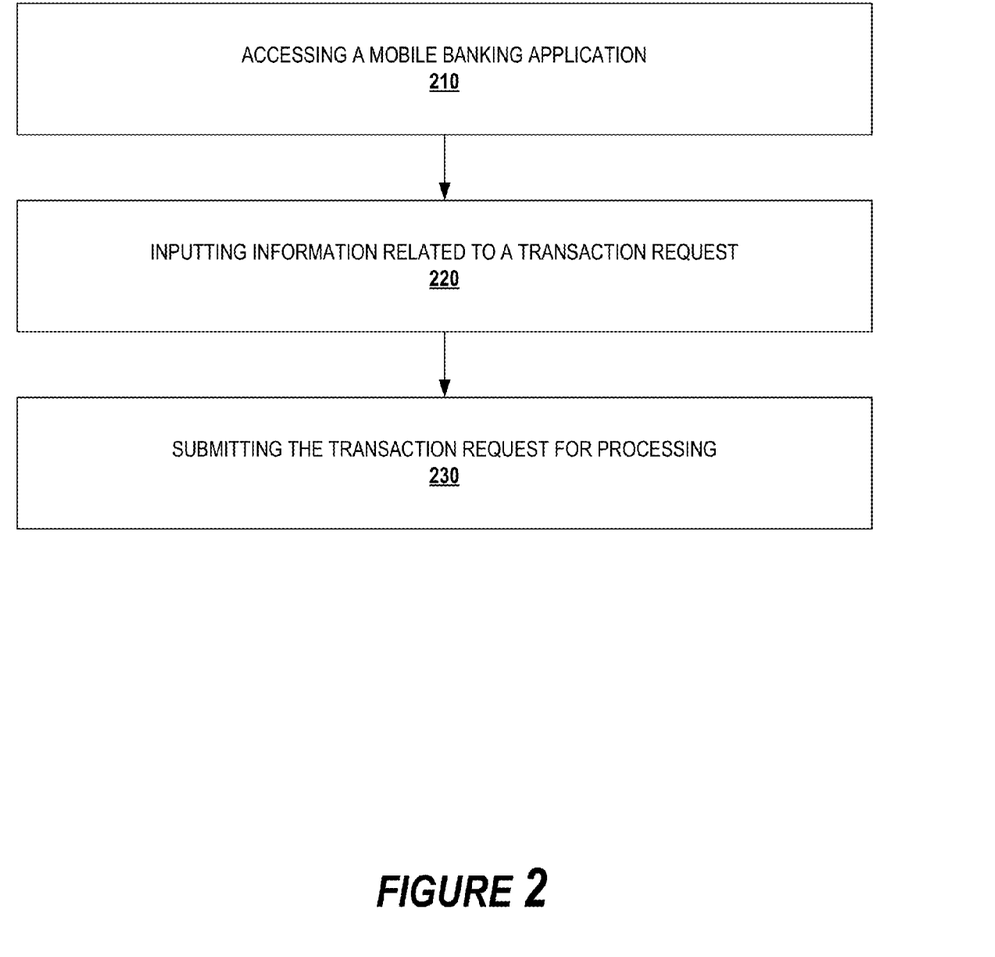
FIG. 2 is a diagram illustrating a general process flow for providing a transaction request, in accordance with embodiments of the present invention.

At step 200, the method includes providing a transaction request with the use of a mobile device. As illustrated in FIG. 2, providing a transaction request may include one or more additional method steps, including but not limited to, accessing a mobile banking application 210, inputting information related to a transaction request 220, and submitting the transaction request for processing.

At step 210, the customer accesses a mobile banking application located on their mobile device. The mobile banking application may be presented on a graphical user interface (GUI) associated with the mobile device. Accessing the mobile banking application may comprise the user providing one or more login credentials prior to being granted access to the application. For example, a customer may be required to provide a user login and password associated with their online banking account prior to accessing the mobile banking application. In some embodiments, the login credentials are stored in the mobile device such that a user is only required to provide the login credentials when initially accessing the mobile banking application. In other embodiments, for added security, the user may be required to provide login credentials each time they access the mobile banking application.

The mobile banking application may be an application provided by the financial institution to allow customers to conduct a number of financial transactions through a mobile device. The mobile banking application may be configured to connect with the financial institution via short message service (SMS) or mobile web associated with a respective mobile device. The mobile banking application may be associated with the customer's online banking account such that transactions initiated and/or completed within the mobile banking application are processed by the financial institution and reflected in both the mobile banking application and the online banking account.

At step 220, the customer may provide information related to a request for processing a particular transaction. The transaction request information is received using an input device, such as a keyboard, associated with the mobile device. The mobile application may facilitate various functions on behalf of the financial institution including, providing a user alerts related to account activity and/or exceeding thresholds associated with an account, providing access to loan, card, and/or mutual fund statements, and allowing the user to manage an insurance policy. The customer may process various transaction's using the mobile banking application. Mobile banking transactions may include, but not be limited to, receiving statements related to an account history, processing ATM transactions, transferring funds from domestic or international accounts, process commercial payments related to online bill-pay, peer-to-peer payments, account withdrawals, account deposits, and the like.

In some embodiments, a transaction request comprises information that is provided by the mobile banking application and not explicitly provided by or received from the user. For example, the transaction request may include "known" information that is associated with every transaction request such as the customer name, customer address, account number and the like. To this extent, the customer may only be responsible for inputting information specifically related to the particular transaction that needs to be processed. Transaction request information provided by the user may include, but not be limited to, the transaction type, the transaction amount, the transaction account, one or more related accounts, the transaction request date, and so forth.

For example, if a customer A needs to transfer funds from their savings account to their checking account. The transaction request information provided by the user may comprise information to indicate the transaction type is a transfer involving a checking account and a savings account associated with the customer's online banking account(s), and that the amount to be transferred is one-hundred dollars ($100). The transaction request information provided by the mobile banking application may comprise information such as the customer's name, Customer A, the customer's address, 123 Street, the savings account number, and the checking account number.

In some embodiments, the transaction request information is not directly inputted into the mobile banking application. Alternatively, the transaction request information may be selected from drop-down menus associated with the mobile banking application. With reference, to the previous example, after indicating that the transaction is a request, the mobile banking application may provide a list of accounts from which the user may transfer funds, and a list of account to which the user may transfer funds.

At step 230, the system may aggregate the information provided, by the mobile banking application and received from the user at the mobile device, to collectively form a transaction request for submission to be submitted to the financial institution for processing.

Figure 3:
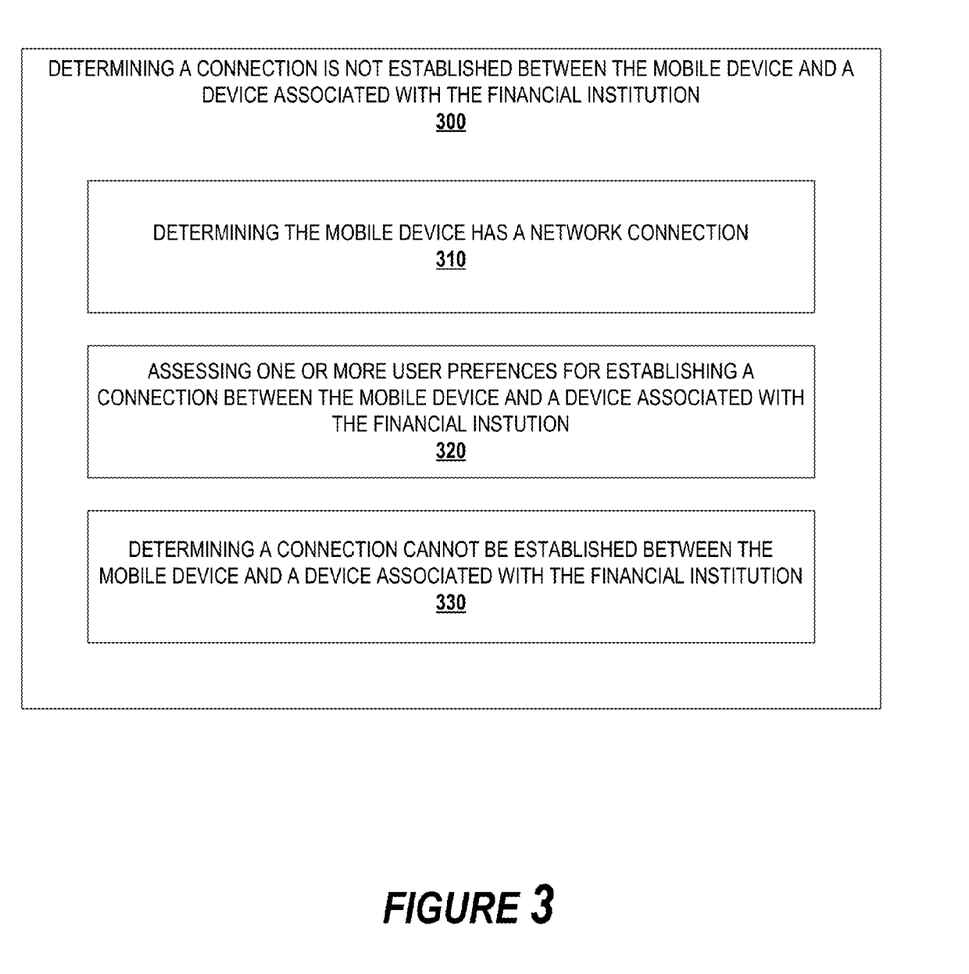
FIG. 3 is a flowchart illustrating a general process flow for determining a connection is not established, in accordance with embodiments of the present invention.

Prior to submitting a transaction request to the financial institution for processing, a connection must be established between the mobile device and a device associated with the financial institution. At step 300, the method includes determining a connection is not established between the mobile device and a device associated with the financial institution. As illustrated in FIG. 3, determining a connection is not established between the mobile device and a device associated with the financial institution may comprises one or more sub steps including, but not limited to determining the mobile device has a network connection 310, assessing one or more user preferences for establishing a connection between the mobile device and a device associated with the financial institution 320, and determining a connection cannot be established between the mobile device and a device associated with the financial institution 330.

At step 300, the system may determine the mobile device has an available network connection. In some embodiments, the network connection may be associated with a service provider responsible for providing data services, such as mobile web or internet, to the mobile device. In response to determining a mobile network connection is not available the system may determine a connection is not and cannot be established between the mobile device and a device associated with the financial institution, at step 330.

In other embodiments, the network connection may be associated with a wireless local area network (LAN), such as a local wireless hot spot. In some embodiments, in response to determining a network connection associated with the mobile device service provider is not available the system may search the surrounding area to determine whether or not a network connection associated with a wireless local area network is available. In some instances, if a wireless LAN is detected the system may automatically connect the device to the wireless LAN. Alternatively, some wireless LANs may require login credentials prior to allowing a device to connect to the wireless LAN. In this instance, in response to detecting the a network associated with a wireless LAN the system may additionally require the user to provide one or more login credentials for accessing the wireless LAN. In response to determining a wireless LAN connection is not available or determining the login credential for accessing the wireless LAN have not been provided the system may determining a connection is not and cannot be established between the mobile device and a device associated with the financial institution, at step 320.

At step 320, the system may assess one or more user preferences for establishing a connection between the mobile device and a device associated with the financial institution. In some embodiments, the user preferences may be related to network security. For example, a user may be fearful of the repercussions associated with transmitting sensitive information across an unsecure network connection. The user may then specify that they prefer for the system to not connect with the financial institution when the mobile device is utilizing an unsecure network connection. In some embodiments, in response to determining the mobile device is currently utilizing an unsecure network connection, the system may determine a connection cannot be established between the mobile device and a device associated with the financial institution, at step 330.

In some embodiments, the user preferences may be related to the status of the network connection the mobile device is currently utilizing. For example, a user may want to reduce the cost associated with mobile data usage. The user may then specify that they prefer for the system to not connect with the financial institution when the mobile device is utilizing a network associated with the mobile device service provider and the network is incurring roaming charges. In some embodiments, in response to determining the mobile device is currently utilizing a mobile network that is incurring roaming charges, the system may determine a connection cannot be established between the mobile device and a device associated with the financial institution, at step 330.

In some embodiments, the user preferences may be related to the type of network connection mobile device is currently utilizing. For example, a user may want to reduce the data usage associated with a mobile network provided by a service provider associated with the mobile device. The user may then specify that they prefer for the system to not connect with the financial institution when the mobile device is not utilizing a wireless LAN provider. In some embodiments, in response to determining the mobile device is not currently utilizing a wireless LAN provider, the system may determine a connection cannot be established between the mobile device and a device associated with the financial institution, at step 330.

At step 330, the system may determine a connection cannot be established between the mobile device and a device associated with the financial institution. As previously described, in some embodiments, the connection cannot be established based upon a networking error associated with the mobile device itself, or user preferences previously specified by the user. In other embodiments, a connection cannot be established based on external factors. For example, in some embodiments a network connection cannot be established based upon an issue present with the receiving device associated with the financial institution. As used herein the term "offline" may refer to any instances where the user is not exchanging information across the network with the financial institution. Being "offline" may be associated with hardware and/or software specifications. Being "offline" may also be associated with user preferences where a user is able to explicitly specify that they want to be "offline". To this extent, the system may additionally have one or more modes of use where a user may specify they want to be in "offline" mode within a specific location or according to certain preferences. For example, "offline" mode may be associated with the airplane mode setting on a user's mobile device. When a user has indicated that they do not want to connect with a mobile network provided by the airlines they may prompt the mobile device or mobile application to be in "offline" mode and not process any transactions. Likewise, when a customer is assured that they are in a trusted location they may place the mobile device and/or mobile application into an "online" mode and allow the application to exchange information with the financial institution. In another example, the parking garage of a local banking branch may be considered a trusted "online" location, whereas any other public network is considered "offline".

Figure 4:
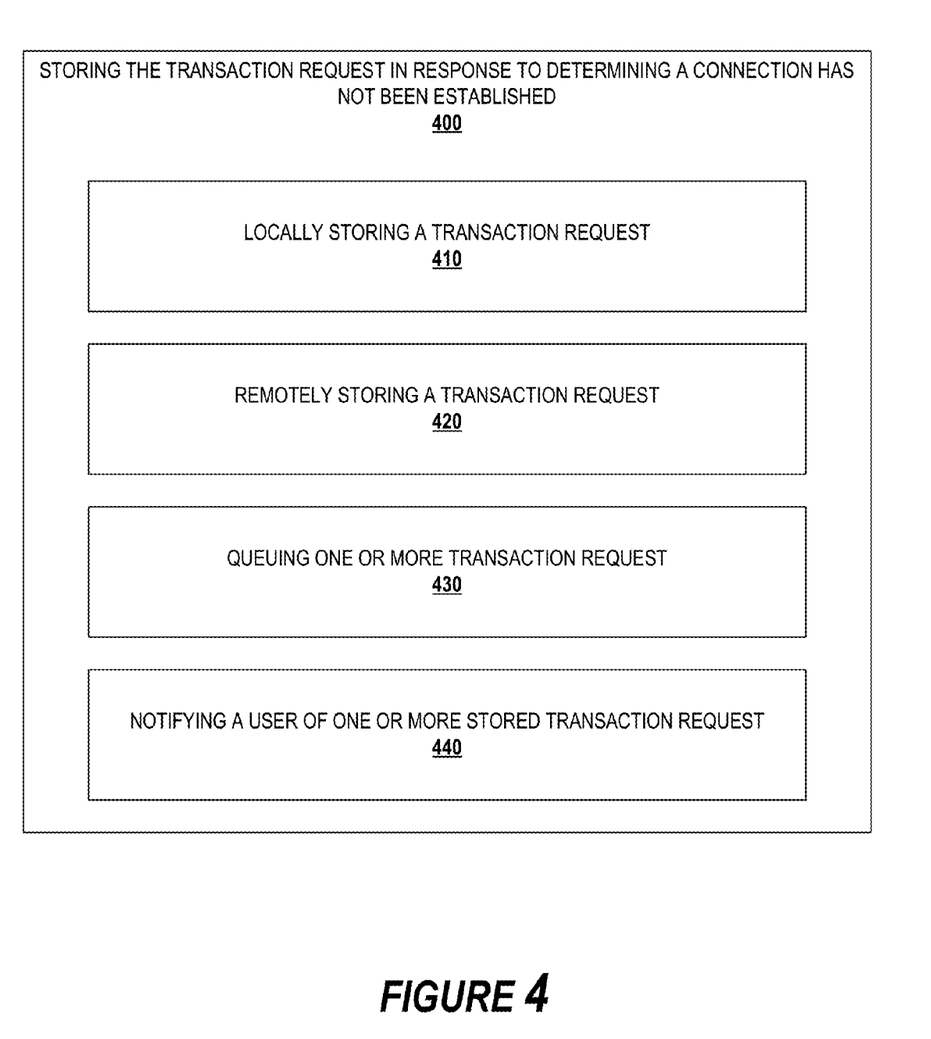
FIG. 4 is a diagram illustrating a general process flow for storing a transaction request, in accordance with embodiments of the present invention.

At step 400, the system may store the transaction request in response to determining a connection has not been established with the financial institutions. As illustrated in FIG. 4, storing the transaction request in response to determining a connection has not been established with the financial institution may comprise one or more additional method steps. The steps may include but not be limited to locally storing a transaction request 410, remotely storing a transaction request 420, queuing one or more transaction request 430.

At step 410, the transaction request may be stored locally on the mobile device. In some embodiments, the transaction request may be stored locally on the mobile device a connection between the mobile device and a device associated with the financial institution has not been established due to a networking error associated with the mobile device. Transaction request may be stored in the memory of the mobile device, and more specifically the data storage area of the mobile device. In some embodiments, the transaction request is stored in a specific portion of the data storage allocated for use with the mobile banking application.

At step 420, the transaction request may be stored remotely in cloud storage. In some embodiments, the transaction request may be stored remotely in cloud storage if the connection is not established between the mobile device and a device associated with the financial institution due to a networking and/or hardware error associated with the financial institution. In some embodiments, transaction request may be stored remotely in a cloud storage associated with the financial institution. In some embodiments, the transaction requests are stored in a specific portion of the cloud storage allocated for use with offline mobile banking transactions and/or online banking transactions. In other embodiments, the transaction request may be stored remotely in a cloud storage that is provided by a third-party storage provider and associated with the user.

At step 430, the system may queue one or more transaction request that are provided by the user. Transactions may be periodically queued in batches or queued in real-time. In some embodiments, the transaction request a queued based upon the chronological order in which they were received. To this extent, the transaction requests are entered into the request queue according to a "first come, first served basis". In other embodiments, the transaction requests are queued based upon one or more preferences specified by the user for queuing transactions. In some embodiments, the user preferences may specify an order of priority that should be used when entering transaction request into the queue. For example, the user may specify that all transactions related to transaction requests related to depositing funds be entered into the request queue prior to any transaction request related to transferring funds. In some embodiments, the transaction requests are queued based upon a combination of user preferences and chronological order in which the request were received. In some embodiments, the transaction may be queued in response to receiving a user identification parameter (e.g. user login credentials).

The mobile banking application may additionally notify the user that a transaction request has been stored due the mobile device and/or the financial institution being currently offline. The notification may additionally provide the user information that indicate the reason for a failed connection and informs the user that the transaction will be submitted to the financial institution when a connection between the mobile device and the financial institution has been established.

The mobile banking application may additionally reflect the stored transaction request in the account history that is displayed on the user's mobile device. For example, if the stored transaction is related to a deposit of funds into the user's checking account when the user accesses the mobile banking application while still offline, the available balance of the related checking account will be temporarily updated to indicate the deposited funds specified in the transaction request.

Figure 5:
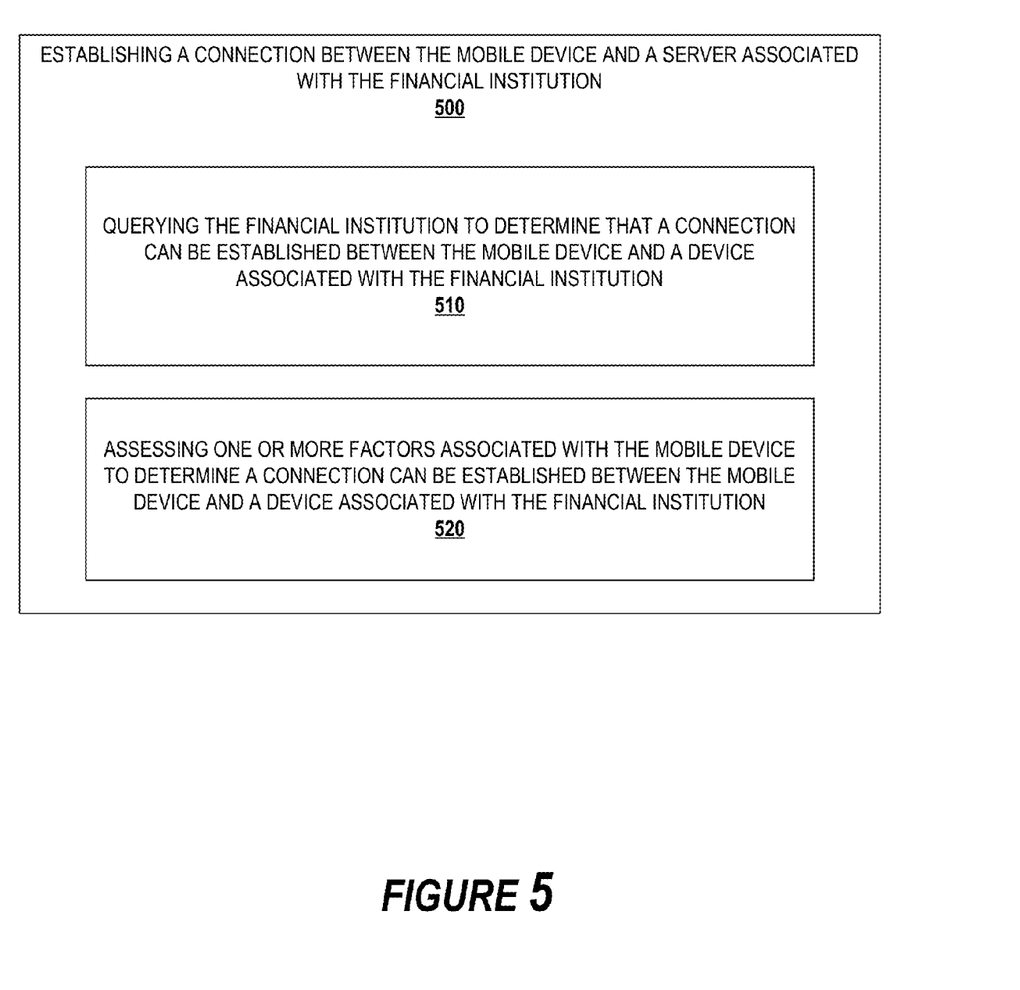
FIG. 5 is a diagram illustrating a general process flow for establishing a connection, in accordance with embodiments of the present invention.

At step 500, the system may establish a connection between the mobile device and a device associated with the financial institution. As illustrated in FIG. 5, establishing a connection between the mobile device and a device associated with the financial institution may comprise one or more additional method steps. The steps may include but not be limited to querying the financial institution to determine that a connection can be established between the mobile device and a device associated with the financial institution 510, assessing one or more factors associated with the mobile device to determine a connection can be established between the mobile device and a device associated with the financial institution 520.

At step 510, the system may query the financial institution to determine that a connection can be established between the mobile device and a device associated with the financial institution. In some embodiments, the system may continuously query the financial institution. In other embodiments, the system may query the financial institution based on a predetermined frequency rate (e.g. every 5 minutes, every half hour, every hour). The user may additionally specify one or more preferences for querying the financial institution. For example the user may specify that the system should re-check every ten (10) minutes to determine whether or not a connection can be established with the financial institution. Querying the financial institution may comprise the mobile device sending one or more messages requesting to establish a connection with a device associated with the financial institution and determining a connection can be established in response to receiving one or more messages from the financial institution indicating an available connection. In response to receiving one or more reply messages the mobile device may establish a connection with a device associated with the financial institution.

At step 520, the system may assess one or more factors associated with the mobile device to determine that a connection can be established between the mobile device and a device associated with the financial institution. In some embodiments, the factors are related to the user preferences for establishing a connection with the financial institution. For example, if the user has specified that a connection should not be established with the financial institution when the mobile device is utilizing a public network, the system may assess the network and establish a connection with the financial institution when it has determined the mobile device is no longer utilizing a public network but is instead connected to a secure private network.

Figure 6:
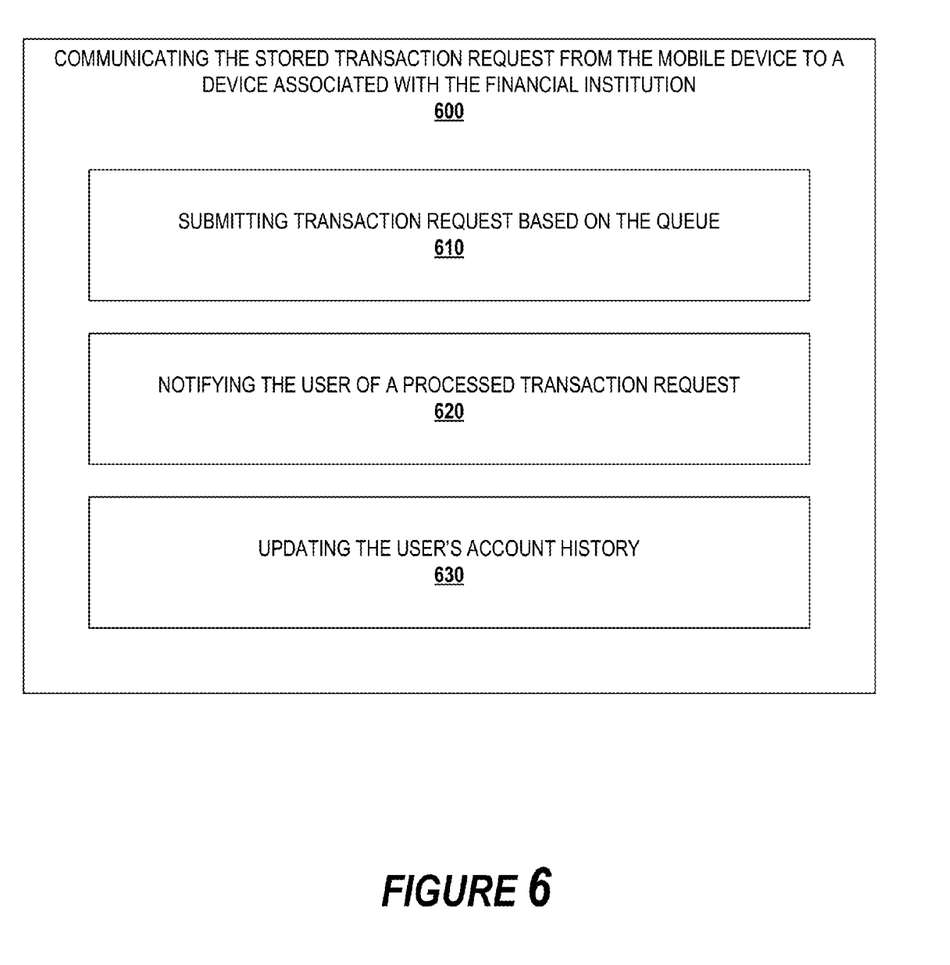
FIG. 6 is a diagram illustrating a general process flow for communicating a transaction request, in accordance with embodiments of the present invention.

At step 600, the system may communicate the stored transactions request from the mobile device to a device associated with the financial institution. As illustrated in FIG. 6, communicating the stored transactions request from the mobile device to a device associated with the financial institution may comprise one or more additional method steps. The steps may include but not be limited to submitting transaction request based on the queue 610, notifying the user of a processed transaction request 620, and updating the user's account history 630.

At step 610, the system may submit one or more transaction requests stored in the queue that have previously been provided by the user. In some embodiments, the transaction requests are submitted a queued based upon the chronological order in which they were received. To this extent, the transaction requests communicated to the financial institution according to a "first come, first served basis". In other embodiments, the transaction requests are communicated to the financial institution based upon one or more preferences specified by the user for processing offline mobile banking transactions. In some embodiments, the user preferences may specify an order of priority that should be used when submitting transactions to the financial institution. For example, the user may specify that all transactions related to transaction requests related to depositing funds be submitted and processed by the financial institution prior to any transaction request related to transferring funds. In some embodiments, the transaction requests are communicated to the financial institution based upon a combination of user preferences and chronological order in which the request were received. In some embodiments, the system may notify the user of a connection being established and request the user to enter one or more user credentials (e.g. user password) prior to submitting the transaction request. For example, in one embodiment, transactions are first queued without a strong authentication process, such as the use of a user password, but the user password is required to be entered prior to communicating the transaction to the financial institution. In an alternative embodiment, transactions are first queued in conjunction with a strong authentication process, such as the use of a user password, and therefore the user password is not required to be entered prior to communicating the transaction to the financial institution.

At step 620, the system may notify the user of a successfully processed transaction request. The notification may additionally comprise a confirmation of the processed transaction that has been provided by the financial institution. Alternatively, the system may notify the user of an unsuccessfully processed transaction request. The notification may comprise additional information indicating one or more reasons as to why the financial institution was unable to process the transaction request. In some embodiments, the financial institution may request the user to edit the transaction request and resubmit it for processing.

At step 630, the system may permanently update the user's account history based upon the transaction request being processing. In an embodiment, where the transaction request was successfully processed by the financial institution the mobile banking application may permanently update the user's account history that is reflected on the mobile device. In an embodiment, where the transaction request was unsuccessfully processed by the financial institution the mobile banking application may reverse and/or undue the previous update that was temporarily indicated in the user's account history.

Figure 7:
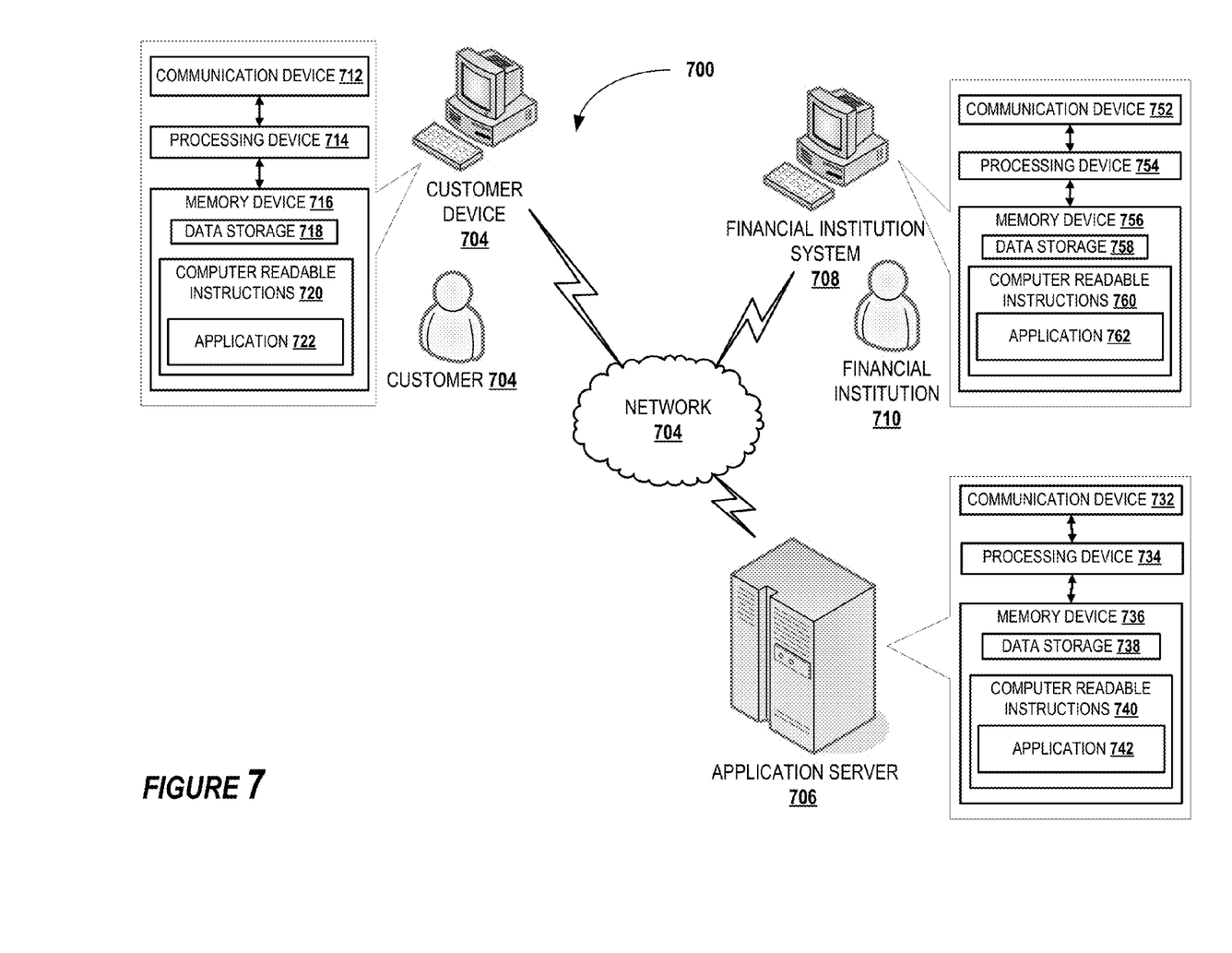
FIG. 7 is a diagram illustrating a system environment for providing an offline mobile banking system, in accordance with embodiments of the present invention.

Referring now to FIG. 7, an offline mobile banking system environment 700, in accordance with one embodiment of the present invention, is illustrated. As shown, the financial institution system 708 is capable of sending and/or receiving information from the application server 706. Likewise, the application server 706 is capable of sending and/or receiving information from the user device 704. This communication may occur across the network 701. The network 701 may be a global area network (GAN), such as the Internet, a wide area network (WAN), a local area network (LAN), or any other type of network or combination of networks. The network 701 may provide for wireline, wireless, or a combination wireline and wireless communication between devices on the network.

The application server 706 may include a processing device 734. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The application server 706 may further include a communication device 732 that is operatively coupled to the processing device 634. The communication device 732 is capable communicating information related to offline mobile banking transactions to the user device 704 and/or financial institution system 708. The processing device 734 uses the communication device 732 to communicate with the network 701 and other devices on the network 701, such as, but not limited to, the financial institution system 708 and the mobile device 704. The communication device 732 generally comprises a modem, server, or other device for communicating with other devices on the network 701.

The processing device 734 is also operatively coupled to the memory device 736. The memory device 736 may house computer-readable instructions 740 which may include a server application 742. In some embodiments, the memory device 736 includes data storage 738 for storing data related to the offline mobile banking system environment 700 including, but not limited to, data used by the server application 742, or information provided by the user 702, user device 704, and/or financial institution system 708. For example, the data storage 738 may store all user information received from the user device 704. The server application 742 may then send the stored user information to the financial institution system 708.

The application server 706 may be operatively coupled over a network 701 to the user device 704, and, in some embodiments, to the financial institution system 708. The financial institution system 708 may include an end system and/or interface used by a business, such as a computer terminal. It should also be noted, in some embodiments the user device 704 may be interchanged with other end consumer systems, such as a mobile device. In this way, the application server 706 can send information to and receive information from the user device 704 and the financial institution system 708 to process offline mobile banking transactions based on information provided by various sources discussed herein. FIG. 7 illustrates only one example of an embodiment of an offline mobile banking system environment 700, and it will be appreciated that in other embodiments one or more of the systems, devices, or servers may be combined into a single system, device, or server, or be made up of multiple systems, devices, or servers.

The financial institution system 708 generally includes a communication device 752, a processing device 754, and a memory device 756. The processing device 754 is operatively coupled to communication device 752, and the memory device 756. The financial institution system 708 may include an input device such as a keyboard device to receive information from an individual associated with the financial institution system 708. The financial institution system 708 may additionally include a reader device including, but not limited to, a magnetic strip reader, a barcode scanner, a radio frequency (RF) reader, a character recognition device, a magnetic ink reader, a processor for interpreting codes presented over an electrical or optical medium, a biometric reader, a wireless receiving device, and/or the like. In some embodiments, the reading device receives information that may be used to communicate instructions via the communication device 752 over a network 701, to other systems such as, but not limited to the application server 706 and/or other systems. The communication device 752 generally comprises a modem, server, or other device for communicating with other devices on the network 701.

The financial institution system 708 includes computer-readable instructions 760 stored in the memory device 756, which in one embodiment includes an application 762. A financial institution system 708 may also refer to any device used to provide information, messages and/or communicate to be sent to a user 702 or the application server 706, including but not limited to, information related to a user 702 requesting one or more offline mobile banking transactions. In some embodiments, the financial institution system 708 may refer only to a plurality of components. For example, the financial institution system 708 may refer to a user device, or a user device and a financial institution device interacting with one another to process offline mobile banking transactions. As used herein, the financial institution may also be interchanged with a system associated with a third party entity.

In some embodiments, the financial institution system 708 may serve as an interface between a financial institution 710 and the application server 706 or user device 704 to enable a financial institution to process offline mobile banking transactions. In some embodiments, the financial institution system 708 is or includes an interactive computer terminal that is configured to initiate, communicate, process, and/or facilitate processing offline mobile banking transactions for the user 702. A financial institution system 708 could be or include any device that may be used to communicate with a user 702 or the application server 706, such as, but not limited to, a digital sign, a magnetic-based payment device (e.g., a credit card, debit card, etc.), a personal identification number (PIN) payment device, a contactless payment device (e.g., a key fob), a radio frequency identification device (RFID) and the like, a computer, (e.g., a personal computer, tablet computer, desktop computer, server, laptop, etc.), a mobile device (e.g., a smartphone, cellular phone, personal digital assistant (PDA) device, music-playback device, personal GPS device, etc.), a financial institution terminal, a self-service machine (e.g., vending machine, self-checkout machine, etc.), a public and/or business kiosk (e.g., an Internet kiosk, ticketing kiosk, bill pay kiosk, etc.), a gaming device, and/or various combinations of the foregoing.

In some embodiments, the financial institution system 708 may be operated in a public place (e.g., on a street corner, at the doorstep of a private residence, in an open market, at a public rest stop, etc.). In other embodiments, the financial institution system 708 is additionally or alternatively operated in a place of business (e.g., in a retail store, post office, banking center, grocery store, factory floor, etc.). In accordance with some embodiments, the financial institution system 708 may not be operated by the user of the financial institution system 708. In some embodiments, the financial institution system 708 is operated by a mobile business operator or a POS operator (e.g., merchant, vendor, salesperson, etc.). In yet other embodiments, the financial institution system 708 is owned by the entity offering the financial institution system 708 providing functionality in accordance with embodiments of the invention described herein.

FIG. 7 also illustrates a user device 704. The user device 704 may include a communication device 712, a processing device 714, and a memory device 716. The processing device 714 is operatively coupled to the communication device 712 and the memory device 716. The processing device 714 uses the communication device 716 to communicate with the network 701 and other devices on the network 701, such as, but not limited to, the application server 706 and the financial institution system 708. The communication device 716 generally has a modem, server, or other device for communicating with other devices on the network 701.

The user device 704 may have computer-readable instructions 720 stored in the memory device 716, which in one embodiment includes the user application 722. Application 722 may cause the processing device to send and receive information related to the user's 702 transaction request. The user device 704 may also include data storage 718 located in the memory device 716. The data storage 718 may be used to store information related to information related to the user's 702 transaction request. A "user device" 704 may or include any mobile communication device, such as a cellular telecommunications device (i.e., a cell phone or mobile phone), personal digital assistant (PDA), a mobile Internet accessing device, or other mobile device including, but not limited to portable digital assistants (PDAs), pagers, mobile televisions, gaming devices, laptop computers, cameras, video recorders, audio/video player, radio, GPS devices, any combination of the aforementioned, or the like. Although only a single user device 704 is depicted in FIG. 7, the offline mobile banking system 700 may contain numerous mobile devices, similar to user device 704.

Any of the features described herein with respect to a particular process flow are also applicable to any other process flow. In accordance with embodiments of the invention, the term "module" with respect to a system may refer to a hardware component of the system, a software component of the system, or a component of the system that includes both hardware and software. As used herein, a module may include one or more modules, where each module may reside in separate pieces of hardware or software.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, microcode, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F#.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory or the like) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

To supplement the present disclosure, this application further incorporates entirely by reference the following commonly assigned patent applications: U.S. patent application Ser. No. 13/946,183 for a "Remote Control for Online Banking," filed Jul. 19, 2013; U.S. patent application Ser. No. 13/946,304 for "Online Banking Alerts," filed Jul. 19, 2013; U.S. patent application Ser. No. 13/946,511 for "Customer-Defined Online Banking Access Restrictions," filed Jul. 19, 2013; U.S. patent application Ser. No. 13/946,658 for "Restricted Access to Online Banking," filed Jul. 19, 2013; U.S. patent application Ser. No. 13/946,570 for "Completing Mobile Banking Transactions from Trusted Location," filed Jul. 19, 2013; U.S. patent application Ser. No. 13/946,581 for "Completing Mobile Banking Transaction with Different Devices," filed Jul. 19, 2013; U.S. patent application Ser. No. 13/946,425 for an "Online Session Transfer," filed Jul. 19, 2013; and U.S. patent application Ser. No. 13/946,068 for "Systems for Managing Account Aggregators Access to Financial Account Information," filed Jul. 19, 2013.

What is claimed is:

1. An apparatus for providing offline mobile banking, the apparatus comprising:
a memory;
at least one processor; and
a module stored in the memory, executable by the processor, and configured to cause the at least one processor to:
provide access, at a mobile device, to a mobile banking application, wherein the mobile banking application is configured to be automatically operable in an online mode when a network connection is established between the mobile device and a device associated with the financial institution, and wherein the mobile banking application is configured to be automatically operable in an offline mode when a network connection is not established between the mobile device and the device associated with the financial institution, wherein the mobile device is associated with a user, and wherein the user has an account maintained by the financial institution;
authenticate the identity of the user based at least partially on one or more authentication credentials electronically received from the user at the mobile device via the mobile banking application;
in response to authenticating the identity of the user, electronically receive, at the mobile device via the mobile banking application, a transaction request from the user, wherein electronically receiving the transaction request comprises a user inputting information related to the transaction request into the mobile banking application;
electronically receive one or more user preferences associated with the transaction request from the user, the one or more user preferences comprising a network security status and a network type for a network connection to be established between the mobile device of the user and the device associated with the financial institution;
electronically receive, at the mobile device via the mobile banking application, a request from the user to submit the transaction request for processing by the financial institution;
in response to receiving the request to submit the transaction request for processing by the financial institution from the user, determine whether or not a network connection is established between the mobile device and the device associated with the financial institution, wherein the module is further configured to:
in response to determining that a network connection is established between the mobile device and the device associated with the financial institution:
determining whether a network security status and a network type associated with the established network connection matches the network security status and the network type associated with the one or more user preferences;
immediately electronically communicate the transaction request from the mobile device to a device associated with the financial institution based at least in part on the mobile banking application being in an online mode and determining that the network security status and the network type associated with the established network connection matches the network security status and the network type associated with the one or more user preferences; and
in response to determining that a network connection is not established between the mobile device and the device associated with the financial institution:
store the transaction request, locally on the mobile device, based at least in part on the mobile banking application being in an offline mode;
store the one or more authentication credentials received from the user locally on the mobile device;
repeatedly, over time, attempt to detect whether or not the network connection is available;
in response to detecting that the network connection is available, establish the network connection between the mobile device and a server associated with the financial institution;
electronically authenticate the mobile device prior to communicating the stored transaction request, wherein the mobile device is electronically authenticated based on device information automatically retrieved from the mobile device, and wherein the device information does not include external data stored locally on the mobile device;
electronically re-authenticate the identity of the user prior to communicating the stored transaction request, wherein the identity of the user is electronically re-authenticated based on the one or more stored authentication credentials such that user input is not required at the time of re-authentication; and
in response to authenticating the mobile device and re-authenticating the identity of the user, electronically communicate the stored transaction request from the mobile device to a device associated with the financial institution.

2. The apparatus of claim 1, wherein communicating the stored transaction request further comprises the module being configured to verify the mobile device is an authenticated device, and wherein verifying the mobile device is an authenticated device does not require user input.

3. The apparatus of claim 1, wherein the transaction request is stored locally on the mobile device.

4. The apparatus of claim 1, wherein the transaction request is store remotely in cloud storage.

5. The apparatus of claim 1, wherein the module is further configured to notify the user that the transaction request cannot be processed in response to response to determining a connection has not been established.

6. The apparatus of claim 1, wherein the module is further configured to temporarily update an account history displayed on the mobile device based at least partially on the stored transaction request.

7. The apparatus of claim 1, wherein storing the transaction request further comprises the module being configured to queue a transaction request based on the order in which it was received.

8. The apparatus of claim 1, wherein storing the transaction request further comprises the module being configured to queue a transaction request based on a priority for the transaction request specified by one or more user preferences.

9. The apparatus of claim 1, wherein storing the transaction request further comprises the module being configured to queue a transaction request based on a priority for the transaction request specified by one or more user preferences.

10. The apparatus of claim 1, wherein the module is further configured to notify the user that the stored transaction request has been successfully processed by the financial institution.

11. The apparatus of claim 1, wherein the module is further configured to notify the user that the stored transaction request has been unsuccessfully processed by the financial institution.

12. A computer-implemented method for providing offline mobile banking, the method comprising:
   providing access, at a mobile device, to a mobile banking application, wherein the mobile banking application is configured to be automatically operable in an online mode when a network connection is established between the mobile device and a device associated with the financial institution, and wherein the mobile banking application is configured to be automatically operable in an offline mode when a network connection is not established between the mobile device and the device associated with the financial institution, wherein the mobile device is associated with a user, and wherein the user has an account maintained by the financial institution;
   authenticating the identity of the user based at least partially on one or more authentication credentials electronically received from the user at the mobile device via the mobile banking application;
   in response to authenticating the identity of the user electronically receiving, at the mobile device via the mobile banking application, a transaction request from the user, wherein electronically receiving the transaction request comprises a user inputting information related to the transaction request into the mobile banking application;
   electronically receiving one or more user preferences associated with the transaction request from the user, the one or more user preferences comprising a network security status and a network type for a network connection to be established between the mobile device of the user and the device associated with the financial institution;
   electronically receiving, at the mobile device via the mobile banking application, a request from the user to submit the transaction request for processing by the financial institution;
   in response to receiving the request to submit the transaction request for processing by the financial institution from the user, determining whether or not a network connection is established between the mobile device and the device associated with the financial institution,
   wherein determining whether or not a network connection is established between the mobile device and the device associated with the financial institution further comprises:
   in response to determining that a network connection is established between the mobile device and the device associated with the financial institution:
      determining whether a network security status and a network type associated with the established network connection matches the network security status and the network type associated with the one or more user preferences;
      immediately electronically communicating the transaction request from the mobile device to a device associated with the financial institution based at least in part on the mobile banking application being in an online mode and determining that the network security status and the network type associated with the established network connection matches the network security status and the network type associated with the one or more user preferences; and
   in response to determining that a network connection is not established between the mobile device and the device associated with the financial institution:
      storing the transaction request, locally on the mobile device, based at least in part on the mobile banking application being in an offline mode;
      storing the one or more authentication credentials received from the user locally on the mobile device;
      repeatedly, over time, attempting to detect whether or not the network connection is available;
      in response to detecting that the network connection is available, establishing the network connection between the mobile device and a server associated with the financial institution;
      electronically authenticating the mobile device prior to communicating the stored transaction request, wherein the mobile device is electronically authenticated based on device information automatically retrieved from the mobile device, and wherein the device information does not include external data stored locally on the mobile device;
      electronically re-authenticating the identity of the user prior to communicating the stored transaction request, wherein the identity of the user is electronically re-authenticated based on the one or more stored authentication credentials such that user input is not required at the time of re-authentication; and
      in response to authenticating the mobile device and re-authenticating the identity of the user, electronically communicate the stored transaction request from the mobile device to a device associated with the financial institution.

13. The method of claim 12, wherein communicating the stored transaction request further comprises verifying the mobile device is an authenticated device, and wherein verifying the mobile device is an authenticated device does not require user input.

14. The method of claim 12, wherein the transaction request is stored locally on the mobile device.

15. The method of claim 12, wherein the transaction request is store remotely in cloud storage.

16. The method of claim 12, the method further comprising notifying the user that the transaction request cannot be processed in response to response to determining a connection has not been established.

17. The method of claim 12, the method further comprising temporarily updating an account history displayed on the mobile device based at least partially on the stored transaction request.

18. The method of claim 12, the method further comprising queuing a transaction request based on the order in which it was received.

19. The method of claim 12, the method further comprising queuing a transaction request based on a priority for the transaction request specified by one or more user preferences.

20. The method of claim 12, wherein communicating the transaction request further comprises communicating a transaction request based on the order in which it was received.

21. The method of claim 12, wherein communicating the transaction request further comprises communicating a transaction request based on a priority for the transaction request specified by one or more user preferences.

22. The method of claim 12, wherein the module is further configured to notify the user that the stored transaction request has been successfully processed by the financial institution.

23. The method of claim 12, wherein the module is further configured to notify the user that the stored transaction request has been unsuccessfully processed by the financial institution.

24. A computer program product for providing offline mobile banking, the computer program product comprising:
   a non-transitory computer-readable medium comprising a set of codes for causing a computer to:
      provide access, at a mobile device, to a mobile banking application, wherein the mobile banking application is configured to be automatically operable in an online mode when a network connection is established between the mobile device and a device associated with the financial institution, and wherein the mobile banking application is configured to be automatically operable in an offline mode when a network connection is not established between the mobile device and the device associated with the financial institution, wherein the mobile device is associated with a user, and wherein the user has an account maintained by the financial institution;
      authenticate the identity of the user based at least partially on one or more authentication credentials electronically received from the user at the mobile device via the mobile banking application;
      in response to authenticating the identity of the user, electronically receive, at the mobile device via the mobile banking application, a transaction request from the user, wherein electronically receiving the transaction request comprises a user inputting information related to the transaction request into the mobile banking application;
      electronically receive one or more user preferences associated with the transaction request from the user, the one or more user preferences comprising a network security status and a network type for a network connection to be established between the mobile device of the user and the device associated with the financial institution;
      electronically receive, at the mobile device via the mobile banking application, a request from the user to submit the transaction request for processing by the financial institution;
      in response to receiving the request to submit the transaction request for processing by the financial institution from the user, determine whether or not a network connection is established between the mobile device and the device associated with the financial institution,
      in response to determining that a network connection is established between the mobile device and the device associated with the financial institution:
         determining whether a network security status and a network type associated with the established network connection matches the network security status and the network type associated with the one or more user preferences;
         immediately electronically communicate the transaction request from the mobile device to a device associated with the financial institution based at least in part on the mobile banking application being in an online mode and determining that the network security status and the network type associated with the established network connection matches the network security status and the network type associated with the one or more user preferences; and
      in response to determining that a network connection is not established between the mobile device and the device associated with the financial institution:
         store the transaction request, locally on the mobile device, based at least in part on the mobile banking application being in an offline mode;
         store the one or more authentication credentials received from the user locally on the mobile device;
         repeatedly, over time, attempt to detect whether or not the network connection is available;
         in response to detecting that the network connection is available, establish the network connection between the mobile device and a server associated with the financial institution;
         electronically authenticate the mobile device prior to communicating the stored transaction request, wherein the mobile device is electronically authenticated based on device information automatically retrieved from the mobile device, and wherein the device information does not include external data stored locally on the mobile device;
         electronically re-authenticate the identity of the user prior to communicating the stored transaction request, wherein the identity of the user is electronically re-authenticated based on the one or more stored authentication credentials such that user input is not required at the time of re-authentication; and
         in response to authenticating the mobile device and re-authenticating the identity of the user, electronically communicate the stored transaction request from the mobile device to a device associated with the financial institution.

25. The computer program product of claim 17, the set of codes for causing a computer to communicate the stored transaction request from the mobile device to a device associated with the financial institution further comprises a set of codes for causing a computer to verify the mobile device is an authenticated device, and wherein verifying the mobile device is an authenticated device does not require user input.

26. The computer program product of claim 17, the computer program product further comprising a set of codes for causing a computer to temporarily update an account history displayed on the mobile device based at least partially on the stored transaction request.

\* \* \* \* \*